US010235518B2

(12) United States Patent
Permeh et al.

(10) Patent No.: US 10,235,518 B2
(45) Date of Patent: Mar. 19, 2019

(54) APPLICATION EXECUTION CONTROL UTILIZING ENSEMBLE MACHINE LEARNING FOR DISCERNMENT

(71) Applicant: Cylance, Inc., Irvine, CA (US)

(72) Inventors: Ryan Permeh, Irvine, CA (US); Derek A. Soeder, Irvine, CA (US); Glenn Chisholm, Irvine, CA (US); Braden Russell, Ladera Ranch, CA (US); Gary Golomb, Santa Cruz, CA (US); Matthew Wolff, Newport Beach, CA (US); Stuart McClure, Irvine, CA (US)

(73) Assignee: Cylance Inc., Irvine, CA (US)

( * ) Notice: Subject to any disclaimer, the term of this patent is extended or adjusted under 35 U.S.C. 154(b) by 0 days.

(21) Appl. No.: 14/616,509

(22) Filed: Feb. 6, 2015

(65) Prior Publication Data

US 2015/0227741 A1   Aug. 13, 2015

Related U.S. Application Data

(60) Provisional application No. 61/937,379, filed on Feb. 7, 2014.

(51) Int. Cl.
*G06F 21/51* (2013.01)
*G06F 21/52* (2013.01)
(Continued)

(52) U.S. Cl.
CPC ............. *G06F 21/51* (2013.01); *G06F 21/52* (2013.01); *G06F 21/566* (2013.01);
(Continued)

(58) Field of Classification Search
CPC ........ G06F 21/51; G06F 21/52; G06N 99/005
See application file for complete search history.

(56) References Cited

U.S. PATENT DOCUMENTS 5,841,947 A * 11/1998 Nordin ................... G06N 3/004
                                                          706/13
6,430,590 B1   8/2002 Fischer
(Continued)

FOREIGN PATENT DOCUMENTS

EP         1762957 A1    3/2007

OTHER PUBLICATIONS

Inoue, Hajime "Anomaly Detection in Dynamic Execution Environments." Abstract of Dissertation. Jan. 31, 2005 (Jan. 31, 2005). XP055191583. ISBN: 978-0-54-249408-6. 190 pages. Retrieved from the Internet: URL:https://www.cs.unm.edu/~forrest/dissertations/inoue-dissertation.pdf [retrieved on May 26, 2015].
(Continued)

*Primary Examiner* — Techane Gergiso
(74) *Attorney, Agent, or Firm* — Jones Day

(57) ABSTRACT

Described are techniques to enable computers to efficiently determine if they should run a program based on an immediate (i.e., real-time, etc.) analysis of the program. Such an approach leverages highly trained ensemble machine learning algorithms to create a real-time discernment on a combination of static and dynamic features collected from the program, the computer's current environment, and external factors. Related apparatus, systems, techniques and articles are also described.

33 Claims, 3 Drawing Sheets

(51) Int. Cl.
*G06F 21/56* (2013.01)
*G06N 99/00* (2010.01)
*H04L 29/06* (2006.01)

(52) U.S. Cl.
CPC ............ *G06N 99/005* (2013.01); *H04L 63/12* (2013.01); *G06F 2221/033* (2013.01); *G06F 2221/2115* (2013.01); *H04L 63/1441* (2013.01)

(56) References Cited

U.S. PATENT DOCUMENTS

| | | | |
|---|---|---|---|
| 6,546,551 B1 | 4/2003 | Sweeney et al. | |
| 7,181,768 B1 | 2/2007 | Ghosh et al. | |
| 7,240,048 B2 | 7/2007 | Pontius | |
| 7,937,705 B1 | 5/2011 | Prael et al. | |
| 7,945,902 B1 | 5/2011 | Sahoo | |
| 8,135,994 B2* | 3/2012 | Keromytis et al. | 714/38.11 |
| 8,347,272 B2 | 1/2013 | Sugawara et al. | |
| 8,370,613 B1* | 2/2013 | Manadhata et al. | 713/2 |
| 8,549,647 B1 | 10/2013 | Mason et al. | |
| 8,631,395 B2 | 1/2014 | Sathyanathan et al. | |
| 8,818,923 B1 | 8/2014 | Hoffmann | |
| 8,856,545 B2* | 10/2014 | Banerjee | G06F 21/00 713/188 |
| 8,887,163 B2 | 11/2014 | Rastogi | |
| 8,930,916 B1 | 1/2015 | Soeder et al. | |
| 9,015,685 B2 | 4/2015 | Greiner et al. | |
| 9,069,916 B2* | 6/2015 | Sarma | G06N 7/005 |
| 9,104,525 B2 | 8/2015 | Dang et al. | |
| 9,176,842 B2 | 11/2015 | Chen et al. | |
| 9,262,296 B1 | 2/2016 | Soeder et al. | |
| 9,378,012 B2 | 6/2016 | Soeder et al. | |
| 2003/0097617 A1* | 5/2003 | Goeller | G06F 11/0748 714/39 |
| 2005/0049497 A1 | 3/2005 | Krishnan et al. | |
| 2005/0102246 A1* | 5/2005 | Movellan | G06K 9/00248 706/12 |
| 2005/0131873 A1* | 6/2005 | Fan | G06F 17/30598 |
| 2006/0047807 A1 | 3/2006 | Magnaghi et al. | |
| 2006/0112388 A1 | 5/2006 | Taniguchi et al. | |
| 2006/0282476 A1 | 12/2006 | Dolby et al. | |
| 2007/0122347 A1* | 5/2007 | Statnikov | G06F 19/24 424/9.341 |
| 2008/0133571 A1 | 6/2008 | O'Sullivan et al. | |
| 2008/0288965 A1 | 11/2008 | Grechanik et al. | |
| 2009/0132449 A1* | 5/2009 | Nagashima | G06N 3/082 706/18 |
| 2009/0133125 A1 | 5/2009 | Choi et al. | |
| 2009/0157571 A1* | 6/2009 | Smith | G06K 9/6256 706/12 |
| 2009/0281923 A1* | 11/2009 | Selinger | G06Q 30/02 705/26.1 |
| 2010/0082400 A1* | 4/2010 | Bagherjeiran | G06Q 30/02 705/14.47 |
| 2010/0082513 A1 | 4/2010 | Liu | |
| 2010/0107170 A1 | 4/2010 | Stehley | |
| 2010/0107245 A1* | 4/2010 | Jakubowski | G06F 21/52 726/22 |
| 2010/0318999 A1 | 12/2010 | Zhao et al. | |
| 2010/0325620 A1 | 12/2010 | Rohde et al. | |
| 2011/0004574 A1* | 1/2011 | Jeong | G06F 9/5066 706/12 |
| 2011/0040825 A1 | 2/2011 | Ramzan et al. | |
| 2011/0138369 A1 | 6/2011 | Chandra et al. | |
| 2011/0238855 A1* | 9/2011 | Korsunsky | G06F 21/55 709/231 |
| 2012/0079490 A1 | 3/2012 | Bond et al. | |
| 2012/0221497 A1 | 8/2012 | Goyal et al. | |
| 2012/0222097 A1* | 8/2012 | Wilson | G06N 99/005 726/5 |
| 2012/0239613 A1* | 9/2012 | Danciu | G06Q 10/06 707/603 |
| 2012/0323853 A1* | 12/2012 | Fries | G06F 11/301 707/649 |
| 2013/0103380 A1 | 4/2013 | Brandstatter et al. | |
| 2013/0152200 A1 | 6/2013 | Alme et al. | |
| 2013/0205279 A1 | 8/2013 | Osminer et al. | |
| 2013/0227683 A1 | 8/2013 | Bettini et al. | |
| 2013/0263097 A1 | 10/2013 | Dawson et al. | |
| 2013/0291111 A1 | 10/2013 | Zhou et al. | |
| 2014/0090061 A1 | 3/2014 | Avasarala et al. | |
| 2014/0136452 A1* | 5/2014 | Wellman | G06N 5/04 706/12 |
| 2014/0180738 A1* | 6/2014 | Phillipps | G06N 99/005 705/7.12 |
| 2014/0188768 A1* | 7/2014 | Bonissone | G06N 99/005 706/12 |
| 2014/0250429 A1 | 9/2014 | Greiner et al. | |
| 2014/0358828 A1* | 12/2014 | Phillipps | G06N 99/005 706/12 |
| 2014/0372513 A1* | 12/2014 | Jones | G06F 9/5072 709/203 |
| 2014/0379619 A1 | 12/2014 | Permeh et al. | |
| 2015/0024367 A1* | 1/2015 | Singh | G06N 99/005 434/362 |
| 2015/0039543 A1 | 2/2015 | Athmanathan et al. | |
| 2015/0106310 A1 | 4/2015 | Birdwell et al. | |
| 2015/0227741 A1 | 8/2015 | Permeh et al. | |
| 2015/0227742 A1 | 8/2015 | Pereira | |

OTHER PUBLICATIONS

Stolfo, Salvatore J. et al. "Anomaly Detection in Computer Security and an Application to File System Accesses". In: "Lecture Notes in Computer Science". Jan. 31, 2005(Jan. 31, 2005). M.S Hacid et al. (Eds):ISMIS 2005, LNAI. Springer. Berlin, Heidelberg. XP055192090. vol. 3488:14-28.

Wang, Xun et al. "Detecting Worms via Mining Dynamic Program Execution." Third International Conference on Security and Privacy in Communications Networks and the Workshops, 2007. SECURECOMM 2007. IEEE. Piscataway, NJ. USA. Sep. 17, 2007 (Sep. 17, 2007) pp. 412-421. XP031276575. ISBN: 978-1-4244-0974-7.

Bird, Steven et al. "Annotation Tools Based on the Annotation Graph API." Jul. 2001. 4 pages.

Dahl et al. "Large-Scale Malware Classification Using Random Projections and Neural Networks." *2013 IEEE International Conference on Acoustics, Speech and Signal Processing (ICASSP)*. May 26-31, 2013. Vancouver, BC. pp. 3422-3426.

De Campos, Luis M. et al. "Bayesian Networks Classifiers for Gene-Expression Data". *Intelligent Systems Design and Applications (ISDA)*. 2011 11th International Conference On, IEEE, Nov. 22, 2011, pp. 1200-1206, XP032086221, DOI: 10.1109/ISDA.2011. 6121822 ISBN: 978-1-4577-1676-8.

Eagle. "Chapter 1: Introduction to Disassembly." *The IDA Pro Book: The Unofficial Guide to the World's Most Popular Disassembler*. San Francisco: No Starch Press. 2nd Edition(2011):3-14.

Iczelion. "Tutorial 1: Overview of PE File format." *Programming Horizon*. Jun. 1, 2013. Wayback Machine. Web. Feb. 23, 2015.

Nguyen, Hoan Anh et al. "A Graph-based Approach to API Usage Adaptation." OOPSLA/SPLASH '10. Oct. 17-21, 2010. Reno/Tahoe, Nevada, USA. Oct. 2010:(302-321).

Rieck et al. "Automatic analysis of malware behavior using machine learning." *Journal of Computer Security*. 19(2011):639-668.

Samak, Taghrid et al. "Online Fault and Anomaly Detection for Large-Scale Scientific Workflows". *High Performance Computing and Communications (HPCC)*, 2011 IEEE 13th International Conference On, IEEE, Sep. 2, 2011, pp. 373-381, XP032068211, DOI: 10.1109/HPCC.2011.55 ISBN: 978-1-4577-1564-8.

Shabtai, A et al. "Detection of malicious code by applying machine learning classifiers on static features: A state-of-the-art survey". *Information Security Technical Report, Elsevier Advanced Technology* Amsterdam, NL, vol. 14, No. 1, Feb. 1, 2009, pp. 16-29, XP026144093, ISSN: 1363-4127.

Shin, DaeMin et al. "Data Hiding in Windows Executable Files." *Proceedings of the 6th Australian Digital Forensics Conference*. Edith Cowan University. Perth Western Australia. Dec. 3, 2008. Research Online.

(56) References Cited

OTHER PUBLICATIONS

Xu, J-Y. et al. "Polymorphic Malicious Executable Scanner by API Sequence Analysis." *Proceedings of the Fourth International Conference on Hybrid Intelligent Systems. (HIS 2004)*.Kitakyushu, Japan. Dec. 5-8, 2004. Piscataway, NJ, USA,IEEE, Dec. 5, 2004 (Dec. 5, 2004), pp. 378-383, XP010778797.
"Data Type". *Wikipedia: The Free Encyclopedia*. Wikimedia Foundation, Inc. Jul. 20, 2015. Web. Jul. 20, 2015. URL: https://en.wikipedia.org/wiki/Data_type.
"File System". *Wikipedia: The Free Encyclopedia*. Wikimedia Foundation, Inc. Jul. 11, 2015. Web. Jul. 20, 2015. URL: https://en.wikipedia.org/wiki/File_system.
Bai et al., Detecting Malicious Behavior Using Critical API-Calling Graph Matching, 2009, 4 pages.
Baysa, D. et al., "Structural entropy and metamorphic malware", Apr. 14th, 2013, Springer-Verlag France 2013, J Comput Virol Hack Tech (2013), pp. 179-192.
Elman, Jeffrey L. "Finding Structure in Time." Cognitive Science. (1990) vol. 14, pp. 179-211.
Koutnik, Jan et aL."A Clockwork RNN." Proceedings of the 31st International Conference on Machine Learning. vol. 32. Feb. 14, 2014 (Feb. 14, 2014). pp. 1863-1871.

\* cited by examiner

APPLICATION EXECUTION CONTROL UTILIZING ENSEMBLE MACHINE LEARNING FOR DISCERNMENT

RELATED APPLICATION

This application claims priority to U.S. Pat. App. Ser. No. 61/937,379 filed on Feb. 7, 2014, the contents of which are hereby fully incorporated by reference.

TECHNICAL FIELD

The subject matter described herein relates to techniques for selectively allowing applications to execute that utilize ensemble machine learning models.

BACKGROUND

Conventional techniques of application execution control for programs run on computer systems rely on static methods such as databases of signatures to determine if a computer can safely run a particular program. Existing application control systems require frequent updates to these databases, and require significant overhead to manage this process. Additionally, their ability to control execution efficiently and correctly reduces as their databases grow. Such approaches utilize significant resources (e.g., memory, CPU, etc.) and additionally have a high management overhead.

SUMMARY

The current subject matter is directed to enabling computers to efficiently determine if they should run a program based on an immediate (i.e., real-time, etc.) analysis of the program. This approach leverages highly trained ensemble machine learning algorithms to create a real-time discernment on a combination of static and dynamic features collected from the program, the computer's current environment, and external factors.

In one aspect, data is received (i.e., received from a remote data source, loaded into memory, accessed from local or connected storage, etc.) that includes at least one feature associated with a program. Thereafter, it is determined, based on the received data and using at least one machine learning model, whether to allow the program to execute or continue to execute (if it is already executing). The program executes or continues to execute if it is determined that the program is allowed to execute. Otherwise, the program is prevented from executing or continuing to execute if it is determined that the program is not allowed to execute.

One or more of the utilized machine learning models can be trained using feature data derived from a plurality of different programs. In addition or in the alternative, one or more of the machine learning models can be trained using supervised learning. Further in addition or in the alternative, one or more of the machine learning models can be trained using unsupervised learning.

The at least one feature of the program can be collected by a feature collector. The feature collector can collect features at a pre-specified point in time (e.g., at commencement of execution of the program or subsequent to execution of the program).

The at least one feature collected by the feature collector can include a combination of point in time measurements and ongoing measurements during execution of the program. The at least one feature collected by the feature collector can include one or more operational features that are passively collected prior to execution of the program, and such operational features can be stored in a cache.

The at least one feature can include at least one operational feature that characterizes an operational environment of a system to execute the program. The at least one operational feature can include one or more of: program reputation, contextual information, system state, system operating statistics, time-series data, existing programs, operating system details, program run status, and configuration variables.

The at least one features can include at least one static feature that characterizes the program. The at least one static feature can be, for example, measurements of the program, structural elements of the program, or contents of the program.

The at least one feature can include at least one dynamic feature that characterizes execution of the program. The at least one dynamic feature can include, for example, interactions with an operating system, subroutine executions, process state, program or system execution statistics, or an order of an occurrence of events associated with the program.

The at least one feature can include at least one external feature from a source external to a system to execute the program. The external feature or features can be obtained, for example, from at least one remote database or other data source.

At least one feature can take a format selected from a group consisting of: binary, continuous, and categorical.

The at least one machine learning model can include an ensemble of machine learning models. The ensemble of machine learning models can include one or more models such as neural network models, support vector machine models, scorecard models, logistic regression models, Bayesian models, decision tree models or other applicable classification models. An output of two or more machine learning models can be combined and used to determine whether or not to allow the program to execute or continue to execute.

The determination can include generating a score characterizing a level of safety for executing the program. The generated score can be used to determine whether or not to allow the program to execute. The determination can also include generating a confidence level for the generated score that is used to determine whether or not to allow the program to execute.

Preventing the program from executing or continuing to execute can include at least one of many actions. These actions can include one or more of: blocking at least a portion of the program from loading into memory, determining that a dynamic library associated with the program is unsafe, blocking the dynamic library associated with the program from loading into memory, unloading a previously loaded module (portion of code, etc.) associated with the program, disabling the program while it is running, implementing constraints on the program prior to it being run or before it continues to run, quarantining at least a portion of the program, or deleting at least a portion of the program.

In some cases, preventing the program from executing or continuing to execute can include one or more of preventing the program from executing individual operations, by modifying an access level of the program, selectively blocking attempted operations, or preventing an attempted operation and instead causing an alternative operation.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter provides more rapid discernment while, at the same time, consuming fewer resources such as memory and processors.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
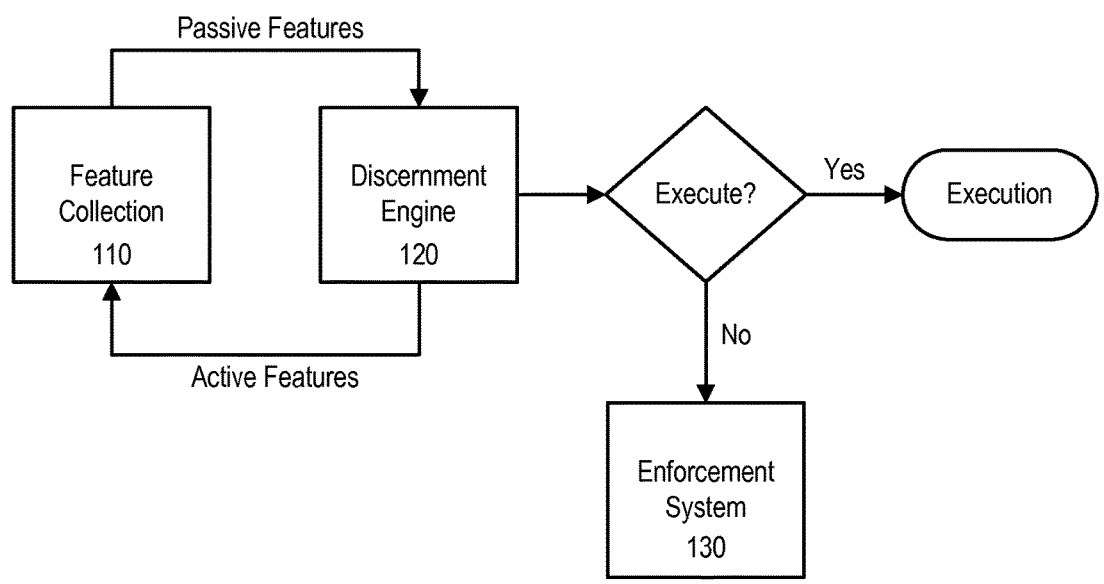
FIG. 1 is a system diagram illustrating elements used to provide application execution control discernment.

The current subject matter can be implemented, in some examples, using three major elements to produce an efficient method of discernment. In this regard, discernment refers to the characterization of whether or not to allow a particular application/application module to execute on a particular computing system or systems. These major software elements are illustrated in diagram 100 of FIG. 1 and can include a feature collection system 110 (sometimes referred to as a feature collector), a discernment engine 120, and an enforcement system 130. The feature collection system 110 collects or otherwise accesses features characterizing a program and/or the environment in which the program is being executed or to be executed. These features are passed on to the discernment engine 120 which can make a decision on whether or not to allow the program to execute. If it is determined that the program should not execute, the enforcement system 130 takes action to prevent the application from executing/continuing to execute.

A "feature" as used herein can include any salient data/data point that can be used to measure the implied safety of a potentially run program. A "program" as used herein is a piece of executable computer code that a user or system wishes to execute, and may include associated data/metadata. "Discernment" as used herein is the process of deciding whether the program should be executed or not (including whether or not to continue executing a program). "Enforcement" as used herein is a process in which the effects of discernment are made effective in a computer system. The current subject matter can utilize one or more machine learning models that are each a mathematically based understanding of a particular situation and one or more algorithms defined to determine an outcome from a particular input against the model. In some variations, an ensemble of machine learning models can be used which is a collection of models utilized in a particular way to generally improve accuracy or reduce variance.

The current subject matter offers an effective method of application control that differs from traditional approaches in a variety of ways. Traditional approaches utilize either the concept of a "blacklist", or a set of programs to explicitly disallow, or a "whitelist", or a set of programs to explicitly allow. The current subject matter foregoes both as primary selection criteria and instead measures various features from the system and uses these against a previously trained machine learning model and/or ensemble of machine learning models.

The ensemble of machine learning models can be devised and trained before application control. Due to the predictive nature of various machine learning algorithms, a trained model allows a "fuzzy" match against safe and unsafe programs. By carefully selecting and training the models in the ensemble, the system can act resiliently against change over time, accommodating small and large changes in program behaviors that resemble "safety" or a lack thereof. A machine learning model may be characterized by an algorithm it incorporates, which may include, as an example, neural networks, support vector machines, logistic regressions, scorecard models, Bayesian algorithms, and decision trees. A machine learning model can be trained using supervised learning, in which a training set of input samples labeled with the desired output values conditions the model to correctly classify samples that do not occur in the training set, or it may be trained using unsupervised learning, in which an algorithm identifies hidden structure in unlabeled data. Reinforcement learning represents a third process for training a model.

Referring back again to diagram 1 of FIG. 1, the feature collector 110 can send passive features (operational and dynamic) on an ongoing basis to the discernment engine 120. The discernment engine 120 can request point in time features from the feature collector 110 at a particular decision point, such as execution. These point in time features can include observations about the computer's state extrinsic to the program or related features from an external source. The discernment engine 120 can then decide if the program should execute. If execution is allowed, the program executes; if execution is disallowed, the enforcement system 130 prevents the application from executing.

Figure 2:
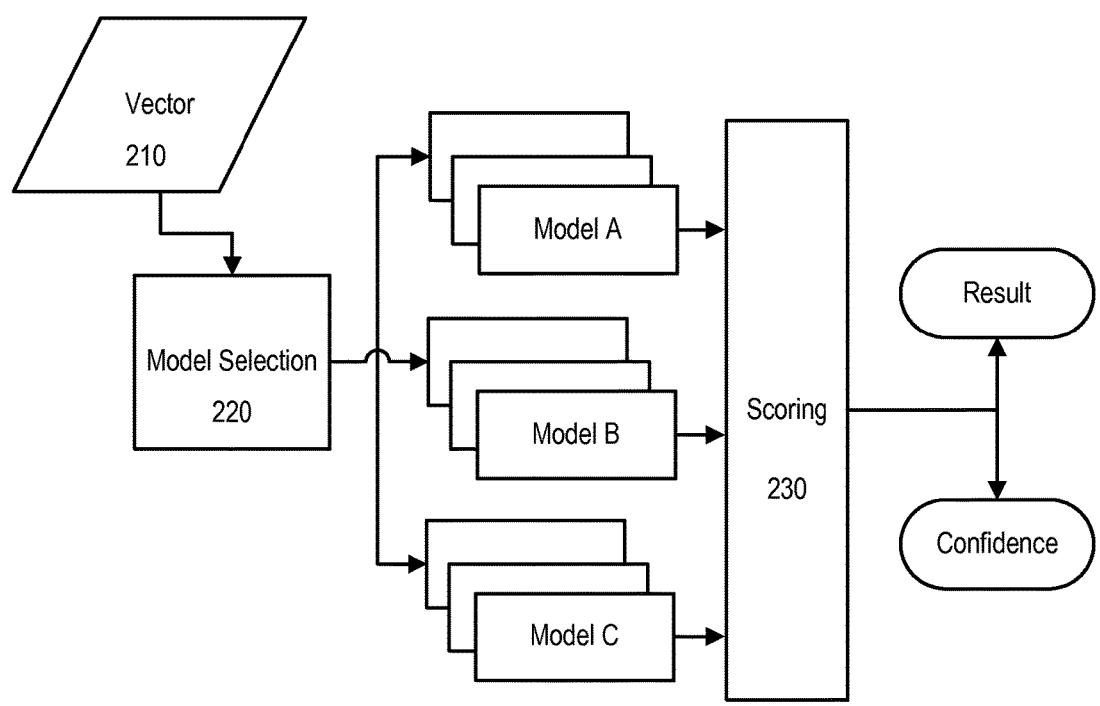
FIG. 2 is a diagram characterizing ensemble discernment.

FIG. 2 is a diagram 200 characterizing ensemble discernment in which an original vector 210 can be passed to the discernment engine 120 for scoring 230. The discernment engine 120 can use a model selector 220 to choose one or more models to run (in this example, Models A, B, C). The selection of a model can be predicated on features provided by the feature collector 110, a user configuration, the current availability or scarcity of computing resources, and/or other state information. Each such model can be comprised of several possible algorithms. The output of the various algorithms and models can be combined (using, for example, a weighting arrangement or model) in a scoring component 230. A final output can be a decision (or in some cases a score) characterizing the results and a confidence level.

Feature collection can be a combination of point in time and ongoing measurements, and can include the passive collection of features into a general cache. Features can be used to generate data points for which the discernment engine 120 makes a decision. The discernment engine 120 can utilize the features collected to make a decision based on previously collected data. The enforcement system 130 can implement the technical details of operation regarding the decisions made from the discernment engine 120.

If a user or other program wishes to execute a program, it will first ask the discernment engine 120 to decide if this is a positive action. The discernment engine 120 can either answer with previous discernments, or create a new discernment using a combination of previously collected features and features collected via a point in time analysis. With the decision made, the enforcement system 130 can implement the logic to allow or disallow execution of the program, and any other elements necessary to implement the discernment decision in an ongoing manner.

Features can be collected from various sources. In one implementation, features can be collected from four primary sources.

A first source can comprise operational features that relate to the operational environment of the system. Operational features can include existing programs, details about the operating system, run status of the program, configuration variables associated with the program, and other measures particular to the environment in which the program is intended to run. Some of these features can be ongoing (i.e., they are active features); others can be determined at a particular point in time (i.e., they are passive features).

A second source can comprise static features that concern the program that wishes to run. Measurements about the program itself, including structural elements and program contents, can be collected. These features can be calculated by examining the contents of the file and processing through analytic methods. One example of a static feature of a program is the size of such program. Examples of structural elements of a program can include the number of sections it comprises, the proportion of the program described by each section, and the proportion of the program not described by any section. The computed Shannon entropy of each section is an example of a feature derived from processing.

A third source can comprise dynamic features that relate to individual program execution. Dynamic features can generally be collected in an ongoing manner. The dynamic features can be associated with a particular program, rather than the system itself. These features can be used to determine potentially hostile activities from a program that was either unable to receive a high confidence discernment prior to execution or otherwise authorized to run under direct management policy.

A fourth source can comprise external features that can be generally extracted from sources of information outside of the host computer itself, generally via a remote data source such as a lookup on the network. This lookup can include a query against a cloud database, or a deeper analysis of certain elements on a network based computer. For example, external features can include a determination by a trusted third party as to a program's authenticity, a program's prevalence among a larger population of computers, and/or the reputations of other computers contacted by a program. Frequently, these features entail knowledge that is impractical to host on an individual computer due to size, complexity, or frequency of updates. Due to the latency of a network lookup, these features can generally be collected in response to a particular request from the discernment engine 120, at a particular point in time.

Features can be collected into efficient computer data structures, such as hash tables, binary trees, and vectors, and the features can be passed to the discernment engine 120. Ongoing features can be collected and held for an appropriate amount of time to ensure their ability to usefully affect the discernment process. Point in time features can be collected in an on-demand manner, typically on the event of discernment.

Features can be binary, continuous, or categorical in nature. Binary features can only be in one of two states. Continuous features can represent a value along a range, and are generally numeric in nature. Categorical features can represent a value within a discrete set of possible values.

Features can be considered first order or second order or nth order. First order features are features measured directly from the source. These features can be combined or further analyzed by various methods to generate second order features. Such further analyzing can include making a mathematical analysis of the value of a first order feature, or by applying combinations of first order features to develop a truly unique second order feature.

The discernment engine 120 can create a decision on the anticipated safety of an application. The discernment engine 120 can receive input from the feature collector 110 and apply an ensemble of machine learning models to calculate a score that determines if an application is safe to run or not, as well as a confidence in the accuracy of the score.

The discernment engine 120 can take features in combination or singly and can, in some cases, use a process known as vectorization to turn individual features into a mathematical vector. This process can involve creating a compact and efficient representation of the input. The vector can be used by the various machine learning algorithms to generate a score.

The use of ensembles allows multiple, distinct models to be tailored to suit more specialized combinations of features within the more common types of programs. Each sample can be approached with a model that is more appropriate for its type. In addition to model specificity, the general ensemble can offer multiple different learning algorithms per model. This allows sample discernment to benefit from multiple different assessments. Some specific models have lower error rates for particular algorithms, and combining them in a weighted manner helps achieve the highest results.

Ensemble models and/or their outputs can be combined using individualized measured error rates in a weighting scheme (such as a scorecard model). Each model that scores can be normalized and adjusted by its measured error rate. This final combination allows for the most accurate understanding from a variety of sources.

The enforcement system 130 can be a component that implements methods for disabling execution of a program. The enforcement system 130 can use a variety of tactics to disable execution in a safe and reliable way.

Decisions regarding a program may not always be determined before program execution, and so there may be some more complex scenarios that require additional handling. The enforcement system 130 can be integrated deeply with the computer operating system and act on behalf of the discernment engine 120.

The enforcement system 130 can implement one or more of blocking a process or dynamic library from loading into memory, unloading a previously loaded module, disabling a running program, implementing constraints on a program to be run, quarantining hostile applications, and/or deleting hostile applications. It is often desirable for the enforcement system 130 to issue an alert when a module determined to be hostile is accessed and/or when action is attempted against a hostile module.

The enforcement system 130 can utilize processes implemented both in the operating system core, and implanted in each process. These processes can allow for high degrees of control from both the core operating system level, as well as deep introspection and control from within the application itself.

Additionally, the enforcement system 130 can utilize tactics for preventing an application from running or restricting its level of access. Such tactics can include moving, renaming, or deleting the program; applying attributes or access controls to the program; forcing the application to run with reduced privileges; forcing the application to run in a "sandbox," where certain actions are redirected to access a virtualized system state; and/or other monitoring and controlling the actions an application may perform.

The systems/technique herein can go into effect when an attempt is made to run a program, or a decision is otherwise warranted by user defined behavior, such as intentionally scanning a file to ascertain its safety.

With reference again to diagram 100 of FIG. 1, the features originating from the operating system and the dynamic feature collection system 110 can continue to stream into the discernment engine 120 in an ongoing manner. These can be generally available for use within the discernment engine 120, and may initiate a discernment action if one is warranted.

Generally, however, the system/methods can be activated during the actions of the system or the user when they choose to either start an application or otherwise choose to determine a file's safety. When one of these events is triggered, the discernment engine 120 can request additional details from the feature collector. The feature collector 110 can then gather the appropriate details and pass them to the discernment engine 120. These features may originate via static, dynamic, operational, or external features.

The discernment engine 120 can take all collected features, and use a vectorization process to develop a vector as input (see diagram 200 of FIG. 2). The input vector 210 can be associated with one or more models by the model selector 220 of the discernment engine 120. For each model the model selector 220 chooses, the input vector 210 can be applied. Each model can have one or more algorithms associated with it, generating a series of individual scores. The outputs of the individual models can be combined in a scoring component 230, utilizing a weighting scheme (e.g., a scorecard model). The scoring component 230 can generate a final score, comprised of a result (e.g., safe or not) and a confidence in that result.

Figure 3:
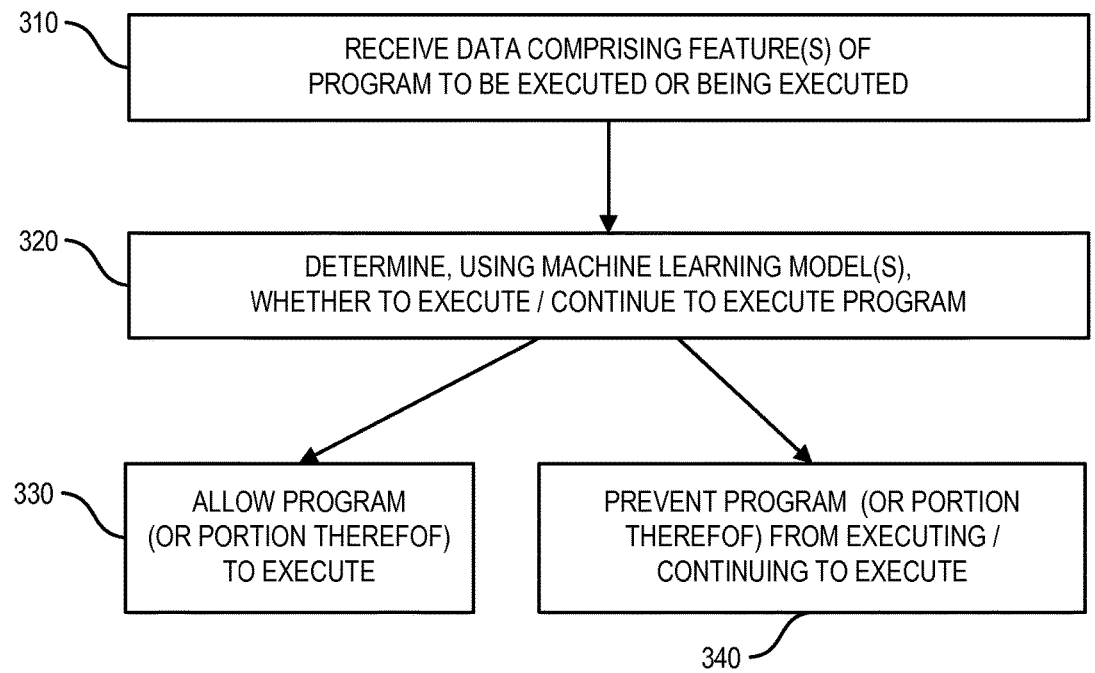
FIG. 3 is a process flow diagram illustrating a method for discernment using at least one machine learning model.

FIG. 3 is a process flow diagram 300 in which, at 310, data is received (i.e., accessed, obtained, etc.) that comprises at least one feature associated with a program. Thereafter, at 320, it can be determined, based on the received data and using at least one machine learning model, whether to allow at least a portion of the program to execute. The at least one machine learning model used in this regard can be trained using, for example, supervised learning and/or unsupervised learning (in some cases there may be a combination of models that use each type of learning). Subsequently, at 330, the program can execute if it is determined that at least a portion of the program is allowed to execute. Otherwise, at 330, at least a portion of the program is prevented from executing/continuing to execute if it is determined that the program (or portion thereof) is not allowed to execute.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic disks, optical discs, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method for implementation by one or more computer systems comprising:
   receiving, from a feature collector, at least one feature from a plurality of possible features to enable a determination of whether to execute or continue to execute at least a portion of a program;
   selecting, by a model collector, a machine learning model from an existing ensemble of machine learning models which can be used to discern at least the portion of the program, the selected machine learning model enabling a determination of whether to allow at least the portion of the program to execute or continue to execute based on whether such at least the portion of the program is deemed safe or unsafe;
   determining, based on the selected machine learning model, whether to allow at least the portion of the program to execute or continue to execute;
   allowing at least the portion of the program to execute or continue to execute, when the selected machine learning model determines that at least the portion of the program is allowed to execute or continue to execute; and
   preventing at least the portion of the program from executing or continuing to execute, when the selected machine learning model determines that at least the portion of the program is not allowed to execute or continue to execute;
   wherein selection of the machine learning model by the model collector is predicated on either which of the possible features are received from the feature collector or a current availability or scarcity of computing resources.

2. The method as in claim 1, wherein the selected machine learning model is trained using feature data derived from a plurality of different programs.

3. The method as in claim 1, wherein the selected machine learning model is trained using supervised learning.

4. The method as in claim 1, wherein the selected machine learning model is trained using unsupervised learning.

5. The method as in claim 1 further comprising:
   collecting, by the feature collector, the received at least one feature.

6. The method as in claim 5, wherein the feature collector collects features at a pre-specified point in time.

7. The method as in claim 6, wherein the pre-specified point in time is at execution or at execution continuation of at least the portion of the program.

8. The method as in claim 1, wherein the received at least one feature comprises a combination of point in time measurements and ongoing measurements during execution or execution continuation of at least the portion of the program.

9. The method as in claim 1, wherein the received at least one feature comprises one or more operational features passively collected prior to execution or execution continuation of at least the portion of the program, and wherein the method further comprises:
   storing the one or more operational features in a cache.

10. The method as in claim 1, wherein the received at least one feature comprises reputation of at least the portion of the program, contextual information, system state, system operating statistics, time-series data, at least a portion of existing programs, operating system details and/or run status of at least the portion of the program and configuration variables.

11. The method as in claim 1, wherein the received at least one feature comprises measurements of at least the portion of the program, structural elements of at least the portion of the program and/or contents of at least the portion of the program.

12. The method as in claim 1, wherein the received at least one feature comprises interactions with an operating system, subroutine executions, process state, execution statistics of at least the portion of the program or a system and/or an order of an occurrence of events associated with at least the portion of the program.

13. The method as in claim 1, wherein the received at least one feature is obtained from at least one remote database or other data source.

14. The method as in claim 1, wherein the received at least one feature takes a format that comprises binary, continuous and/or categorical.

15. The method as in claim 1, wherein one or more machine learning models of the ensemble of machine learning models comprises neural network models, support vector machine models, scorecard models, logistic regression models, Bayesian models and/or decision tree models.

16. The method as in claim 1, wherein the selecting of the machine learning model includes, at least, selecting two or more machine learning models.

17. The method as in claim 1, wherein the determining comprises generating a score characterizing a level of safety for executing or continuing to execute at least the portion of the program, wherein the generated score is used to determine whether to allow at least the portion of the program to execute or continue to execute.

18. The method as in claim 17, wherein the determining further comprises generating a confidence level for the generated score, wherein the generated confidence level is used to determine whether to allow at least the portion of the program to execute or continue to execute.

19. The method as in claim 1, wherein the preventing of at least the portion of the program from executing or continuing to execute comprises blocking at least the portion of the program from loading into memory.

20. The method as in claim 1 further comprising:
   determining that a dynamic library associated with at least the portion of the program is unsafe;
   wherein the preventing of at least the portion of the program from executing or continuing to execute comprises: blocking the dynamic library associated with at least the portion of the program from loading into memory.

21. The method as in claim 1, wherein the preventing of at least the portion of the program from executing or continuing to execute comprises: unloading a previously loaded module associated with at least the portion of the program.

22. The method as in claim 1, wherein the preventing of at least the portion of the program from executing or continuing to execute comprises: disabling at least the portion of the program while it is running.

23. The method as in claim 1, wherein the preventing of at least the portion of the program from executing or continuing to execute comprises one or more of:
   implementing constraints on at least the portion of the program prior to it being run or before it continues to run;
   quarantining at least the portion of the program; and
   deleting at least the portion of the program.

24. The method as in claim 1, wherein the preventing of at least the portion of the program from executing or continuing to execute comprises one or more of: preventing at least the portion of the program from executing individual operations, modifying an access level of at least the portion of the program, selectively blocking attempted operations and preventing an attempted operation and instead causing an alternative operation.

25. The method of claim 1, wherein the received at least one feature comprises at least one operational feature that characterizes an operational environment of a system to execute at least the portion of the program.

26. The method of claim 1, wherein the received at least one feature comprises at least one dynamic feature that characterizes execution of at least the portion of the program.

27. The method of claim 1, wherein the received at least one feature comprises at least one external feature from a source external to a system to execute at least the portion of the program.

28. The method of claim 1, wherein the received at least one feature comprises at least one static feature that characterizes at least the portion of the program.

29. A system comprising:
   at least one hardware data processor; and
   memory storing instructions which, when executed by the at least one hardware data processor, result in operations comprising:
      receiving a plurality of features from at least two difference to enable a determination of whether to execute or continue to execute at least a portion of a program based on whether such at least the portion of the program is deemed safe or unsafe;
      selecting, based on the received plurality of features, a machine learning model from an existing ensemble of machine learning models which can be used to discern at least the portion of the program, the selected machine learning model enabling a determination of whether to allow at least the portion of the program to execute or continue to execute;
      determining, based on the selected machine learning model, whether to allow at least the portion of the program to execute or continue to execute;
      allowing at least the portion of the program to execute or continue to execute, when the selected machine learning model determines that at least the portion of the program is allowed to execute or continue to execute; and
      preventing at least the portion of the program from executing or continuing to execute, when the selected machine learning model determines that at least the portion of the program is not allowed to execute or continue to execute;
   wherein the preventing of at least the portion of the program from executing or continuing to execute comprises one or more of:
      implementing constraints on at least the portion of the program prior to it being run or before it continues to run;
      quarantining at least the portion of the program; and
      deleting at least the portion of the program.

30. The system of claim 29, wherein at least one feature from the received plurality of features comprises reputation information about at least the portion of the program.

31. The system of claim 29, wherein at least one feature from the received plurality of features comprises measurements of at least the portion of the program or structural elements of at least the portion of the program.

32. The system of claim 29, wherein the selecting of a machine learning model includes at least selecting two machine learning models.

33. The system of claim 29, wherein the at least two sources are selected from a group consisting of: operational features that relate to an operational environment of the system, static features that are associated with the program, dynamic features that relate to execution of the program, or external features that are extracted from a source other than the system executing the program.

* * * * *

UNITED STATES PATENT AND TRADEMARK OFFICE
CERTIFICATE OF CORRECTION

PATENT NO.        : 10,235,518 B2
APPLICATION NO.   : 14/616509
DATED             : March 19, 2019
INVENTOR(S)       : Ryan Permeh et al.

Page 1 of 1

It is certified that error appears in the above-identified patent and that said Letters Patent is hereby corrected as shown below:

In the Claims

In Column 9, Claim 1, Line 21, replace "model collector" with --model selector--;

In Column 9, Claim 1, Line 43, replace "model collector" with --model selector--.

Signed and Sealed this
Twenty-ninth Day of October, 2019

Andrei Iancu
*Director of the United States Patent and Trademark Office*